United States Patent [19]

Hrusch

[11] 3,951,361

[45] Apr. 20, 1976

[54] ARTICULATED MAIN LANDING GEAR

[75] Inventor: Louis C. Hrusch, Chesterland, Ohio

[73] Assignee: Pneumo Corporation, Boston, Mass.

[22] Filed: June 23, 1975

[21] Appl. No.: 589,368

[52] U.S. Cl. ............................................ 244/102 R
[51] Int. Cl.² .......................................... B64C 25/12
[58] Field of Search ...... 244/102 R, 102 A, 102 SL, 244/17.17

[56] References Cited
UNITED STATES PATENTS

| | | | |
|---|---|---|---|
| 2,241,213 | 5/1941 | Mercier | 244/102 R |
| 3,086,733 | 4/1963 | Hartel | 244/102 R |

FOREIGN PATENTS OR APPLICATIONS

| | | | |
|---|---|---|---|
| 1,239,919 | 7/1971 | United Kingdom | 244/102 R |

Primary Examiner—Trygve M. Blix
Assistant Examiner—Barry L. Kelmachter
Attorney, Agent, or Firm—Donnelly, Maky, Renner & Otto

[57] ABSTRACT

An articulated, retractible landing gear for helicopters and the like includes a three member drag brace assembly having a retraction brace pivotally connected to the helicopter fuselage at its inboard end and to an upper drag brace at its outboard end, with the latter pivotal connection being along the articulation axis of the landing gear, the upper brace being pivotally connected at its other end to a lower brace which in turn is connected to the oleo strut of the landing gear by a universal joint, the pivotal connection between the upper and lower braces in the extended position of the landing gear being on an axis normal to both the drag brace center line and the articulation axis.

7 Claims, 4 Drawing Figures

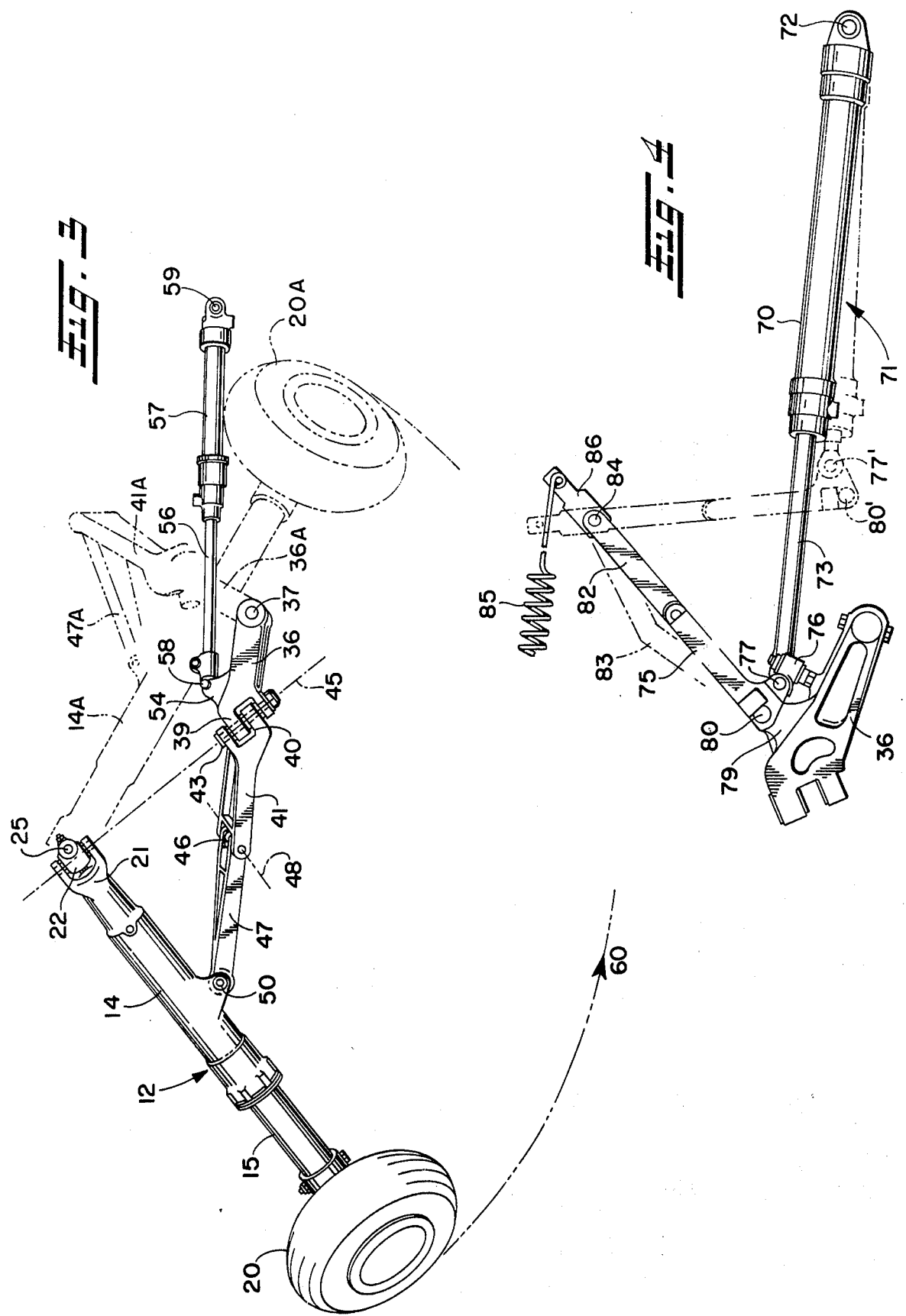

ARTICULATED MAIN LANDING GEAR

The present invention relates in general to helicopter landing gears and in particular to a three member drag brace system for an articulated, retractible landing gear.

Helicopter landing gears are frequently designed to remain in a fixed or landing position throughout flight. For example, Hartel U.S. Pat. No. 3,822,048 discloses a fixed position landing gear operative to maintain the tire a predetermined lateral distance from the fuselage during all landing and support modes of the gear. Such Hartel landing gear included a single member drag brace. To provide a retractibility feature, drag brace systems consisting of plural members are often necessary to meet design requirements. Examples of plural member drag brace systems are shown in Hartel U.S. pat. No. 3,086,733; Smith U.S. Pat. No. 3,393,883; Hartel U.S. Pat. No. 2,939,655; Hawkins U.S. Pat. No. 2,487,548; Mercier U.S. Pat. No. 2,241,213; Lucien U.S. Pat. No. 2,935,277; and Paxhia U.S. Pat. No. 3,121,547.

The principal object of the present invention is to provide a three member drag brace for a retractible landing gear operative to preclude fore and aft stroking of the tire during landing and support phases. Such object is accomplished by providing a triangular truss consisting of the oleo strut for one leg, the upper and lower drag braces for the second leg and the articulation axis of the landing gear for the third leg.

It is another object of the present invention to provide a three member drag brace and gear actuating system operative to retract the landing gear into a fuselage well of limited vertical clearance. Such object is accomplished by pivoting the inboard or retraction member of the drag brace to the fuselage along an axis more nearly vertical than the retraction axis of the landing gear and by providing an extra degree of freedom with an articulation axis for the landing gear.

It is yet another object of the present invention to provide a three member drag brace for a retractible landing gear wherein the three members when extended are rigidly maintained in longitudinal alignment without special locking mechanisms. Such object is accomplished by pivotally connecting the outboard end of the retraction brace to the inboard end of the upper brace along the articulation axis and by pivotally connecting the outboard end of the upper brace to the inboard end of the lower brace along an apex axis normal to both the longitudinal axis of the extended drag brace and the articulation axis of the landing gear.

These and other objects and advantages of the present invention will become apparent as the following description proceeds.

To the accomplishment of the foregoing and related ends, the invention, then, comprises the features hereinafter fully described and particularly pointed out in the claims, the following description and the annexed drawings setting forth in detail certain illustrative embodiments of the invention, these being indicative, however, of but a few of the various ways in which the principles of the invention may be employed.

In said annexed drawings:

FIG. 3 is a plan view of the articulated landing gear taking generally along line 3—3 of FIG. 2.

FIG. 4 is a partial plan showing a different actuation mechanism for the retraction brace.

Figure 1:
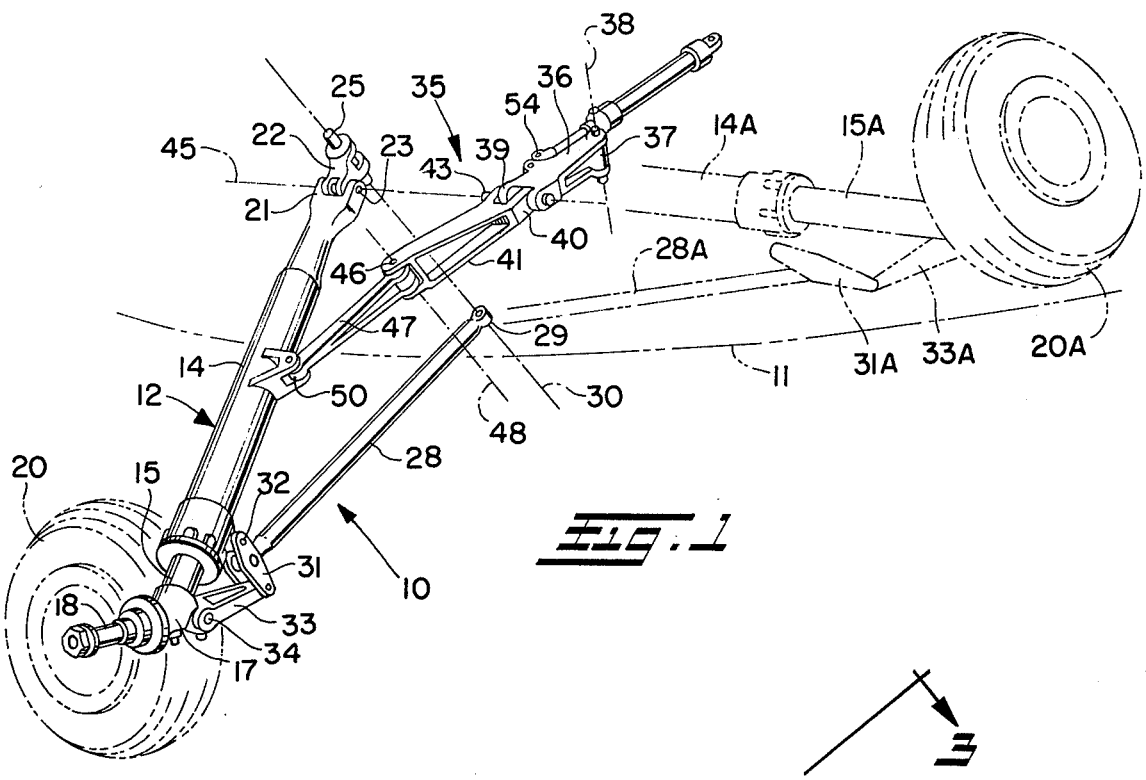
FIG. 1 is a perspective of the articulated main landing gear in its extended position, with the retracted position of the landing gear being illustrated in phantom lines.
Figure 2:
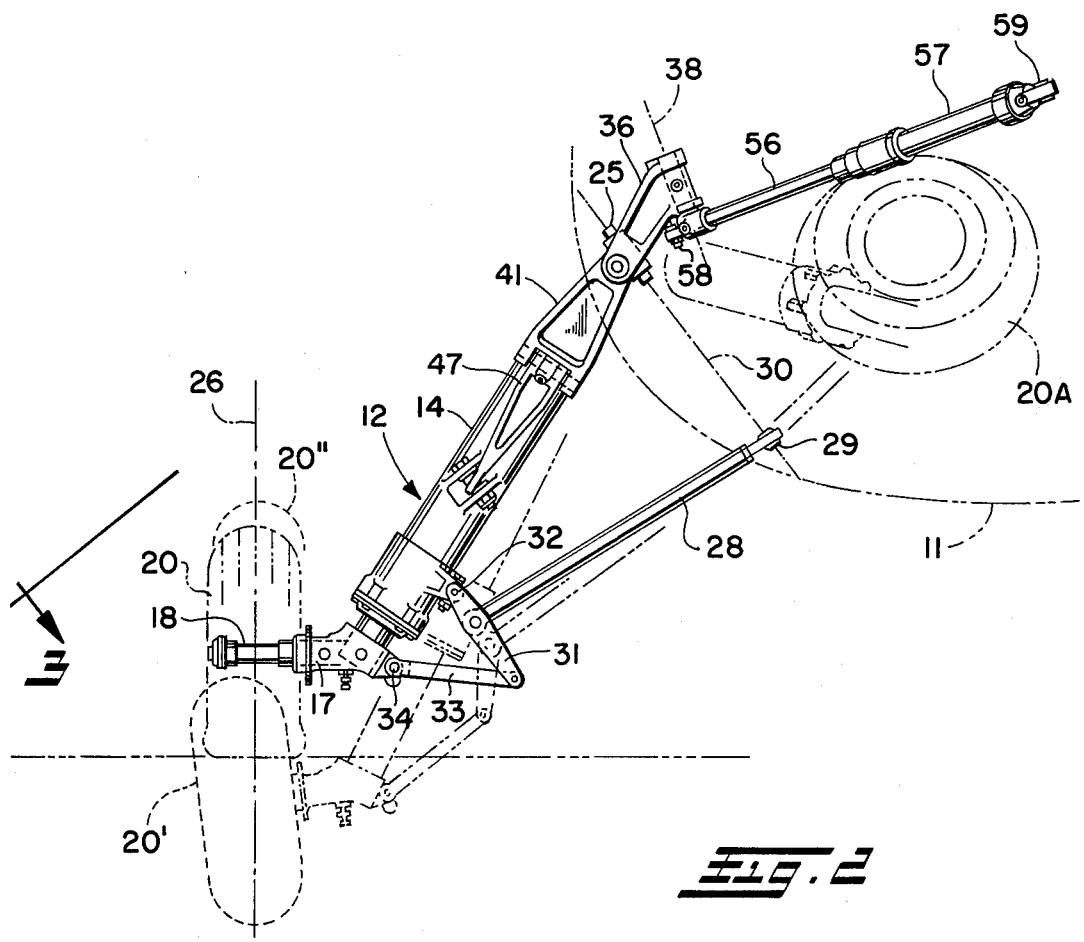
FIG. 2 is an end elevation of the landing gear shown in FIG. 1, looking toward the front of the aircraft fuselage.

Referring now in more detail to the drawings and initially to FIGS. 1 through 3, the landing gear indicated generally at 10 is shown in combination with a helicopter fuselage 11, although the particular aircraft type forms no part of the present invention except for the structural and cooperative interrelationship between the articulated landing gear of the present invention and the aircraft fuselage. Landing gear 10 acts in conjunction with an identical mirror image landing gear on the opposite side of the fuselage as the main support for the helicopter, with the front portion of the fuselage being supported on two castering nose wheels. Since the main landing gears are identical in construction, only one such landing gear will be described, with the understanding that the discussion applies equally to the other such landing gear.

The articulated main landing gear 10 includes a shock absorbing main oleo strut indicated generally at 12 which extends outwardly and downwardly from the aircraft fuselage when the landing gear is extended. The oleo strut includes a cylinder 14 having an internal bore in which a piston (not shown) slidingly reciprocates. The piston has a piston rod 15 connected thereto and extending downwardly and outwardly therefrom to form the free or outboard end of the oleo strut 12. The bottom end of the piston rod 15 has a wheel support 17 connected thereto, such wheel support including an axle spindle 18. A tire 20 is mounted on a wheel (not shown) which in turn is rotatably mounted on the axle spindle 18.

The upper or inboard end of the oleo strut 12 is provided with a clevis 21 that receives one set of ears on universal block 22. A pivot bolt 23 is passed through aligned holes in clevis 21 and the ears of universal block 22 to form a pivotal connection between the universal block and oleo strut. The universal block in turn is pivotally connected to the helicopter fuselage by bolt 25, with the axes of bolts 23 and 25 being substantially at right angles to one another.

As shown, a linkage system is provided to maintain the tire 20 at a substantially fixed lateral distance from the fuselage during all operational modes of the landing gear. This specific type of linkage system and other linkage systems for the same purpose are disclosed and claimed in the above-mentioned Hartel U.S. Pat. No. 3,822,048, assigned to the assignee of the present invention.

Such linkage system includes a fixed length strut 28 connected at its inboard end to the fuselage by a universal joint 29, the latter connection defining with pivot bolt 25 the retraction axis 30 of the landing gear 10. The fixed length connecting rod 28 is below but vertically aligned with the oleo strut 12. The outboard end of the fixed length strut is pivotally connected to link 31, which is pivotally connected at 32 to cylinder 14 of the oleo strut. The other end of link 31 is pivotally connected to control link 33 which in turn is pivotally connected at 34 to wheel mount 17. Link 31 and control link 33 form a toggle joint connecting cylinder 14 to piston rod 15. Such toggle joint not only cooperates with the fixed length strut 28 in controlling the extension of piston rod 15 but also functions as a torque arm couple to permit axial telescopic movement of the piston rod with respect to the cylinder while precluding relative rotation therebetween.

The linkage assembly just described thus forms two interrelated four bar linkages operative to control the extension of the oleo strut. The first four bar linkage is the oleo strut system consisting of cylinder 14, piston rod 15, and links 31 and 33. The second four bar linkage is the control system consisting of fixed length strut 28, link 31, cylinder 14, and the aircraft fuselage.

In the landing and support operations, fluid pressure is provided to the head end of the piston normally to bias the piston rod outwardly and downwardly. When the helicopter is in flight and the landing gear 10 is extended, the piston rod will be in the phantom line position shown in FIG. 2. The maximum forces on the landing gear are experienced during initial contact with the ground resulting in maximum compression of the oleo strut. Such initial contact causes the oleo strut 12 to pivot upwardly and outwardly relative to the fuselage with the fixed length strut 28 and oleo strut cylinder 14 describing arcs of different radii about different fixed fulcrum points 30 and 23, respectively. AS a result of the different lengths and arcs of the cylinder 14 and fixed length strut 28, the link 31 is caused to pivot counterclockwise about point 32 as viewed in FIG. 2 upon such contact, thereby to control the position of link 33 and thus the extension of piston rod 15. Such control results in the outward vector of the pivotal movement of the oleo strut relative to the fuselage being directly compensated for by the inwardly directed horizontal vector of the retracting piston rod 15. This counterbalancing of horizontally directed vectors results in the tire moving along a vertical line 26, which is a fixed lateral distance from the fuselage, in both the extended but unloaded position of the tire 20' and the initial loaded position of the tire 20''.

During static support conditions for the aircraft, the forces on the wheel assembly are reduced resulting in the piston rod being forced outwardly by the pressurized fluid at the head of the piston and further resulting in the oleo strut being pivoted slightly downwardly and inwardly relative to the fuselage 11. The outward movement of the piston rod 15 is controlled by the linkage assembly according to the downward pivotal movement of the oleo strut, thereby to maintain the fixed lateral spacing between the tire and the helicopter fuselage. In other words, the inwardly directed horizontal vector of the oleo strut caused by the inwardly and downwardly directed pivotal movement thereof is compensated for by an equal but outwardly directed horizontal vector caused by the controlled extension of the piston rod 15.

The landing gear just described is provided with a three member drag brace assembly indicated generally at 35, which, in the extended position of the landing gear, extends longitudinally downwardly and forwardly from fuselage 11 to cylinder 14 of oleo strut 12. Such drag brace assembly 35 includes a retraction brace 36 that is pivotally connected to the aircraft furselage at 37, with such pivotal connection having fixity about the two axes normal to the pivot axis 38 for such pivotal connection. The pivot axis 38 of the retraction brace connection to the fuselage is not parallel to the retraction axis 30 of the landing gear 10.

The clevis 39 on the outboard end of retraction brace 36 is interdigitated with clevis 40 on the inboard end of upper drag brace 41. A pivot bolt 43 is passed through aligned apertures in the interdigitated clevises 39 and 40 to provide a pivotal connection between retraction brace 36 and upper drag brace 41. Such bolt 43 is axially aligned with pivot bolt 23 interconnecting the oleo strut 12 and universal block 22 to define therewith the articulation axis 45 for the landing gear in its extended or down position. In other words, the interdigitated clevises 39 and 40 and pivot bolt 43 form the articulation joint of the drag brace assembly.

The outboard end of upper brace 41 is pivotally connected at 46 to the inboard end of lower brace member 47, such pivotal connection forming the apex joint of the drag brace assembly. The apex joint lies upon an axis 48 normal to the longitudinal axis of the extended drag brace assembly 35, which permits the upper and lower drag links 41 and 47, respectively, to be used as common parts on either the left or right-hand landing gear. The apex joint axis 48 for the interconnection between the upper and lower brace members is perpendicular to and thus crosses, when extended, the articulation axis 45 of the landing gear. The outboard end of lower drag brace 47 is connected by universal joint 50 to the cylinder 14 of oleo strut 12.

In the extended position of the landing gear, a triangular truss is formed by oleo strut cylinder 14, articulation axis 45 and the upper and lower drag braces 41 and 47, respectively. Such triangular truss prohibits fore and aft stroking of the tire 20 during all landing and support modes of the landing gear. In addition, the crossing relationship of the apex joint axis and the articulation axis and the moment carrying capacities of the articulation joint and apex joint of the drag brace provide rigidity to the drag brace during landing. Specifically, during landing and support modes, the moment carrying capacity of the articulation joint and its relative spatial relationship to the apex joint preclude pivotal movement or collapse at the apex joint. Similarly, the moment carrying capacity of the apex joint and its relative spatial relationship to the articulation joint preclude pivotal movement or collapse of the drag brace at the articulation joint during landing and support modes. Thus, no special locks for the apex joint are required to maintain the longitudinal alignment of the extended three member drag brace during landing and support modes.

In flight, the landing gear may be retracted into a wheel well in the fuselage by an actuating mechanism indicated generally at 52. Such actuating mechanism includes laterally extending ears 54 on the retraction brace 36 to which the piston rod 56 of locking actuator 57 is pivotally connected by bolt 58. The locking actuator 57 in turn is pivotally connected at 59 to the helicopter fuselage 11. As shown in FIG. 3, the piston rod 56 is fully extended in the down position of the landing gear, with such piston and piston rod being positively locked in such position by the locking actuator 57 in well known manner.

When retraction is desired, the piston of the locking actuator 57 is unlocked, the pressure on the head end of the piston vented, and pressure applied to the other side of the piston inwardly to stroke such piston thereby to retract piston rod 56. The moment on retraction brace 36 caused by piston rod 56 retracting is transferred across the articulation joint resulting in a shear load at the apex joint. Such shear load in turn creates an axial load on the lower drag brace to cause the oleo strut 12 and fixed length strut 28 to pivot in the direction shown by arrow 60 about retraction axis 30. When the retraction is complete, the locking actuator automatically relocks the piston in the cylinder positively to hold the landing gear in its retracted position. In the fully retracted and locked position of actuator 57, the tire, oleo strut, and drag brace assembly assume the positions shown in the phantom lines in FIG. 3, with such parts in the retracted position being identified in the drawings by identical reference numerals followed by the alphabetic notation A.

In moving from the extended to the retracted position, the landing gear has described a relatively flat arc for two reasons. First, the inboard pivot axis 38 of the retraction brace is not parallel to the retraction axis 30 but instead is more nearly vertical in its orientation, and second, the landing gear has an extra degree of freedom provided by the articulation axis. Such flat arc permits the landing gear to be received in a fuselage well of reduced vertical clearance.

Instead of the relatively expensive locking actuator 57, a over center linkage in conjunction with a piston cylinder assembly may be used selectively to lock the drag brace on either the extended or retracted positions. As shown in FIG. 4, the cylinder 70 of piston cylinder assembly 71 is pivotally connected at 72 to the fuselage 11 of the aircraft. The piston (not shown) is slidingly received in the bore of cylinder 70, with the reciprocal stroke of such piston being controlled by a pneumatic or hydraulic system (not shown). The piston rod 73 is connected at one end to the piston and extends downwardly and outwardly therefrom to terminal connections with the retraction brace 36 and an L-shape link 75 of the over center linkage.

More particularly, the piston rod 73 is pivotally connected to an outwardly extending boss 76 on retraction brace 36 and is also pivotally connected at 77 to the short leg or moment arm of the L-shape link 75. The L-shape link 75 is pivotally connected at the apex of its legs to an outwardly extending flange 79 on retraction brace 36 as shown at 80. The end of the long leg of link 75 is connected to one end of a second link 82, with such connection permitting a relative folding movement in one direction as indicated by the phantom lines 83 but precluding movement past the straight line orientation in the other direction. The second link 82 at its other end is pivotally connected to the fuselage as shown at 84, such link 82 being normally biased in a counterclockwise direction as viewed in FIG. 4 by a spring 85 acting on a tab 86 effectively secured to link 82.

In the extended position of the piston rod 73, the pivotal connection 77 of the rod 73 to the moment arm of link 75 is below the pivotal connection 80 of the link 75 to the retraction brace 36, thereby to impart a clockwise movement to link 75 positively to bring links 75 and 82 into straight line orientation to lock the same. When the piston rod 73 is retracted by reversing the pressure on the piston, a counterclockwise movement is initially imparted to link 75 to permit folding of links 75 and 82 thereby resulting in retraction of the landing gear as above described.

When retraction of the rod 73 is nearly complete as shown in phantom lines, pivotal connection 77′ assumes a position above pivotal connection 80′ as viewed in FIG. 4 thereby to again impart a clockwise movement to link 75 to lock links 75 and 82 in straight line orientation. Such straight line orientation of the links 75 and 82 positively holds the gear in retracted position until the piston cylinder assembly is again actuated.

Although the invention has been shown and described with respect to a perferred embodiment, it is obvious that equivalent alterations and modifications will occur to others skilled in the art upon the reading and understanding of this specification. The present invention includes all such equivalent alterations and modifications, and is limited only by the scope of the claims.

The embodiments of the invention in which an exclusive property or privilege is claimed are defined as follows:

1. In combination with an aircraft fuselage, a retractible articulated landing gear for helicopters and the like comprising a shock absorbing oleo strut having a tire on its outboard end, means connecting the inboard end of the oleo strut to the fuselage for pivotal movement about a retraction axis and an articulation axis, and a three member drag brace assembly extending between the fuselage and the oleo strut, a first member of said drag brace assembly being pivotally connected to the fuselage at its inboard end and to a second member at its outboard end, the latter pivotal connection lying along the articulation axis, the second member being pivotally connected at its outboard end to a third member which in turn is connected at its outboard end to the oleo strut by a universal joint, the pivotal connection of the second and third members being perpendicular to the articulation axis when the gear is extended.

2. The landing gear of claim 1 further including actuator means extending between the fuselage and the first member of the drag brace assembly selectively, reciprocally to move the oleo strut between extended and retracted positions relative to the fuselage.

3. The landing gear of claim 2 wherein the actuator means includes a locking actuator automatically operative to lock the landing gear in the position selected.

4. The landing gear of claim 2 wherein the actuator means includes a piston cylinder assembly and an over center linkage means, with the over center linkage means being automatically operative to lock the landing gear in the position selected.

5. The landing gear of claim 2 wherein the three members of the drag brace assembly are axially aligned in the extended position of the oleo strut and the pivotal connection of the second and third members is perpendicular to the center line of the three axially aligned members.

6. The landing gear of claim 5 wherein a triangular truss for the landing gear in its extended position is formed by the second and third members of the drag brace along one leg of the triangle, by the articulation axis of the landing gear along the second leg of the triangle and by the oleo strut along the third leg of the triangle, such triangular truss acting to preclude fore and aft stroking of the tire during landing and support modes.

7. The landing gear of claim 1 wherein the axis for the pivotal connection of the first member to the fuselage is more nearly vertical than the retraction axis of the landing gear.

* * * * *